F. C. HIGGINS.
GEAR SHIFT CONTROLLING MECHANISM.
APPLICATION FILED MAY 7, 1921.

1,416,466.

Patented May 16, 1922.
4 SHEETS—SHEET 1.

Inventor
Frank C. Higgins
By his Attorneys

F. C. HIGGINS.
GEAR SHIFT CONTROLLING MECHANISM.
APPLICATION FILED MAY 7, 1921.

1,416,466.

Patented May 16, 1922.
4 SHEETS—SHEET 2.

Inventor
Frank C. Higgins
By his Attorneys

F. C. HIGGINS.
GEAR SHIFT CONTROLLING MECHANISM.
APPLICATION FILED MAY 7, 1921.

1,416,466.

Patented May 16, 1922.
4 SHEETS—SHEET 3.

Inventor
Frank C. Higgins
By his Attorneys
Merchant Kilson & Kilson

UNITED STATES PATENT OFFICE.

FRANK C. HIGGINS, OF MINNEAPOLIS, MINNESOTA.

GEAR-SHIFT-CONTROLLING MECHANISM.

1,416,466.  Specification of Letters Patent.  Patented May 16, 1922.

Application filed May 7, 1921. Serial No. 467,530.

*To all whom it may concern:*

Be it known that I, FRANK C. HIGGINS, a citizen of the United States, residing at Minneapolis, in the county of Hennepin and State of Minnesota, have invented certain new and useful Improvements in Gear-Shift-Controlling Mechanism; and I do hereby declare the following to be a full, clear, and exact description of the invention, such as will enable others skilled in the art to which it appertains to make and use the same.

My invention relates to mechanical gear shifting mechanism for automobiles or motor-propelled vehicles, and, generally stated, consists of the novel devices and combinations of devices hereinafter described and defined in the claims.

More definitely stated, the invention provides an improved gear shift controlling mechanism and includes a selecting lever or element adapted to be pre-set for any one of the several speeds forward or reverse, combined with automatic selecting devices, which, by a certain movement of the clutch lever or pedal, will automatically shift the transmission gear for the speed or function predetermined by the setting of said selecting lever.

This shift controlling mechanism is especially adapted for use in connection with transmission mechanism of the selective sliding gear type such as now very generally used in connection with automobiles or vehicles driven by internal combustion engines.

The improved gear shifting mechanism, in what is at present believed to be the preferred form thereof, is illustrated in the accompanying drawings, wherein like characters indicate like parts throughout the several views.

Referring to the drawings.

Directing attention first to Fig. 1, which shows the gear shift controlling mechanism connected to the shifting rods and clutch lever of an automobile transmission of the sliding selective type, the standard parts of said mechanism may be briefly noted as follows:

The numeral 13 indicates the transmission casing, the numeral 14 the fly wheel, the numeral 15 the clutch, (normally set by a coiled clutch spring 16 and, as shown, being of a multiple disk type). The numeral 17 indicates the clutch lever or pedal, the numeral 18 the combined spur pinion and internal clutch member driven from the fly wheel through the clutch, the numeral 19 the transmission shaft spindle and the numerals 20 and 21 indicate spur gears rotatable with but slidable on said spindle 19. The numerals 22, 23, 24 and 25 indicate spur gears rotatable with a countershaft 26. The hub of the gear 21 has internal clutch teeth slidable into and out of interlocking action with the teeth of the pinion 18. The numerals 27 and 28 indicate the shifting rods or slides that carry forked arms 27ᵃ and 28ᵃ, respectively engageable with peripherally grooved hubs of the gears 20 and 21.

Figures 1, 2, 3:
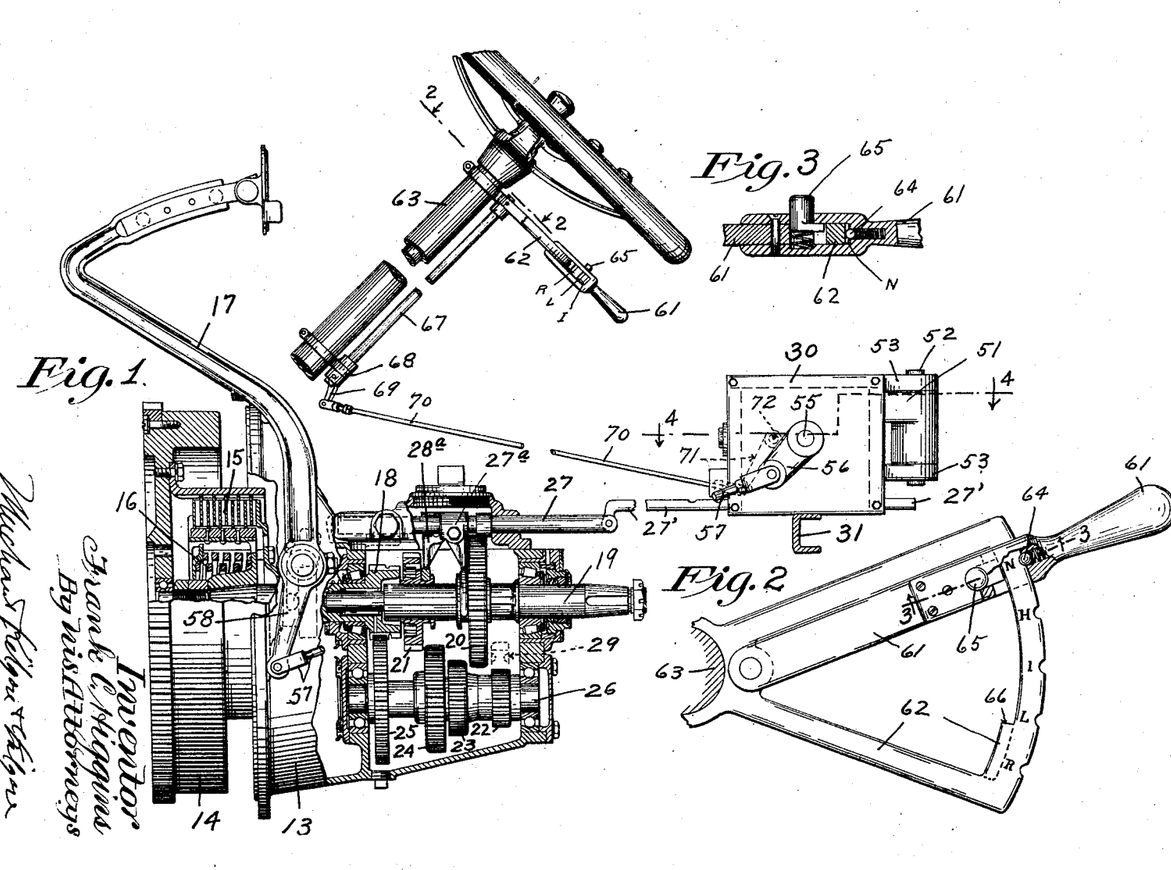
Fig. 1 is a fragmentary view partly in side elevation and partly in vertical section, illustrating the manner of connecting the improved gear shift controlling mechanism to the transmission of an ordinary or standard automobile.
Fig. 2 is a plan view of the selecting lever and certain co-operating parts, some parts being sectioned on the oblique line 2—2 of Fig. 1 and some parts being broken away.
Fig. 3 is a fragmentary section on the line 3—3 of Fig. 2.

Figs. 1 shows the transmission gears in neutral positions. For reverse drive, the gear 20 is slid rearward into mesh with an intermediate gear 29, (shown only by dotted lines in Fig. 1), which is in constant mesh with the gear 22. For low gear, said gear 20 is slid forward into mesh with the gear 23. For intermediate gear, the spur gear 21 is slid rearward into mesh with the gear 24; and for high gear, the internal clutch teeth of the gear 21 are engaged with the rear portions of the teeth of the primary driving gear 18. These actions are all well understood.

My improved controller mechanism is arranged to properly produce the above noted sliding movements of the shifting rods 27 and 28 as predetermined by the preliminary or advanced setting of the selecting lever or primary selecting device but subsequently and actually produced by what may be treated as an abnormal movement of the clutch lever or pedal, all as will more fully hereinafter appear.

It may be here further stated that the transmission mechanism so far specifically described in connection with the drawings is well known standard construction such as found in most automobiles and in which the shifting plungers 27 and 28 are given movements such as described by the direct manual manipulation of a single gear shift lever.

For the convenient application of my controlling mechanism, the shifting rods 27 and 28 are shown as provided with parallel extension rods or bars 27' and 28', respectively, pivotally connected thereto and arranged to slide through a metallic controller box 30, shown as secured to one of the frame cross beams 31 and adapted to be located in any convenient place such as under the front seat of an automobile.

Figure 6:
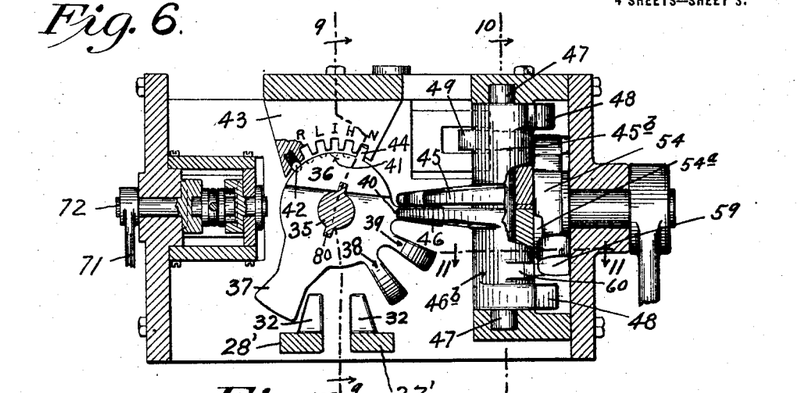
Fig. 6 is a vertical section taken approximately on the line 6—6 of Fig. 4.
Figure 9:
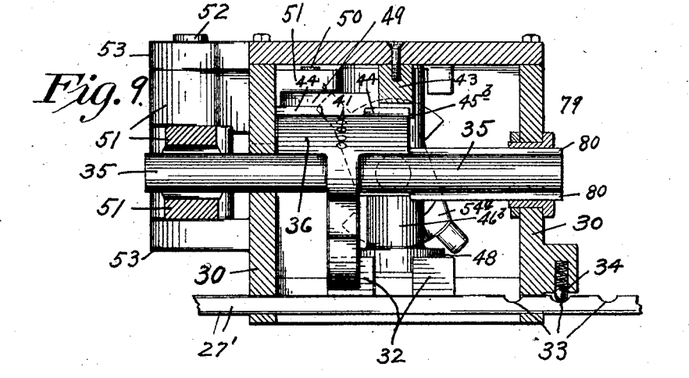
Fig. 9 is a vertical section taken on the line 9—9 of Fig. 6.
Figure 10:
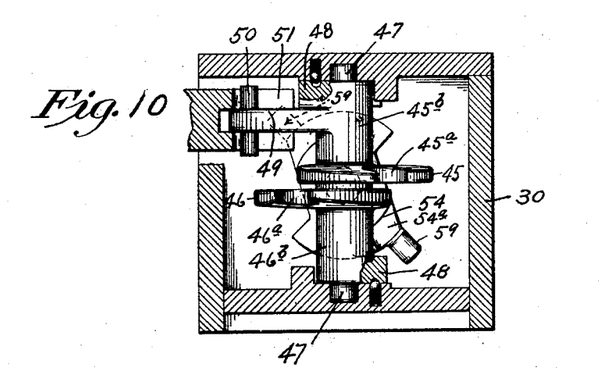
Fig. 10 is a vertical section taken on the line 10—10 of Fig. 6.

The slide extensions 27' and 28' each have longitudinally spaced but quite closely positioned upstanding driving lugs or shoulders 32, (see particularly Figs. 6 and 9), and each bar also has, as shown, three depressions 33 subject to a spring-pressed detainer ball 34 or the like that is spring-seated in a wall of the controller box 30.

Mounted to rotate in the box 30 and to slide axially parallel to the shifting rod extensions, is a shaft 35 to which is rigidly secured a so-called shifter head 36, the upper portion of which, as shown, is somewhat less than semi-cylindrical and the narrower lower portion of which is provided with radially projecting circumferentially spaced driving lugs or projections 37, 38, 39 and 40. The lug 37, as will hereinafter appear, cooperates with the lugs 32 on the rod extensions 27' and 28'.

Figure 4:
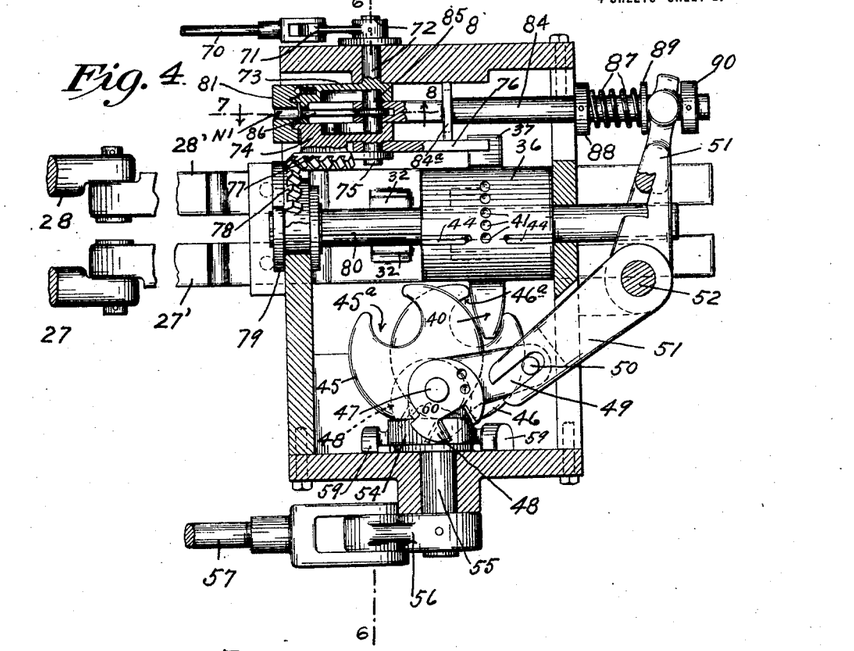
Fig. 4 is a horizontal section taken approximately on the line 4—4 of Fig. 1.

The shifter head 36 is capable of being set rotatively in five different positions, respectively, for neutral, high, low, intermediate and reverse, and, hence, is advisably provided on the upper surface of a cylindrical top with five indentations 41 circumferentially spaced and arranged to be yieldingly engaged by a spring-pressed retaining ball, 42, (see Figs. 4 and 6), mounted in a segmental lock flange 43 secured to and depending from the top of the box 30. This lock flange or plate 43, on its under edge, is provided with five lock notches marked $n$, $h$, $i$, $l$ and $r$ and arranged to co-operate with longitudinally spaced lock ribs or keys 44 on the top of the shifter head 36.

For co-operation with the lugs 38, 39 and 40 of the shifter head 36, there is provided two reversely movable so-called shifter jaws 45 and 46 provided, respectively, with notches 45$^a$ and 46$^a$. These two jaws, as preferably formed, are flat members lying, the one closely over the other and having, respectively, sleeve-like hubs 45$^b$ and 46$^b$ rotatively mounted on a short upright shaft 47 secured within the box 30.

The sleeve-like hubs 45$^b$ and 46$^b$, respectively, at their upper and lower ends, have notched segments 48. One of the jaw hubs, to wit, as shown, the upper sleeve-like jaw hub 45$^b$, has a radially projecting arm 49 equipped with a crank pin 50 that engages the notched free end of a bell crank 51 pivoted on a pin 52 mounted in lugs 53 on the box 30. The function of this bell crank lever will be later noted, but it may be here stated that, simply as a matter of convenience, it has a large opening that permits the outer end of the shaft 35 to freely pass therethrough.

For action on the notched segments 48 of the shifter jaws 45 and 46, I provide a so-called shifter jaw rocker, which, as shown, is in the form of a somewhat distorted disk 54 rigidly secured to a short rock shaft 55 mounted in one side of the box 30 and provided at its outer end with an arm 56. This arm 56, by a rod 57, is connected to an arm 58 that is secured to and depends from the hub of the clutch lever or pedal 17, (see particularly Figs. 1 and 4). The manner in which this connection operates will be hereinafter fully described.

Figure 5:
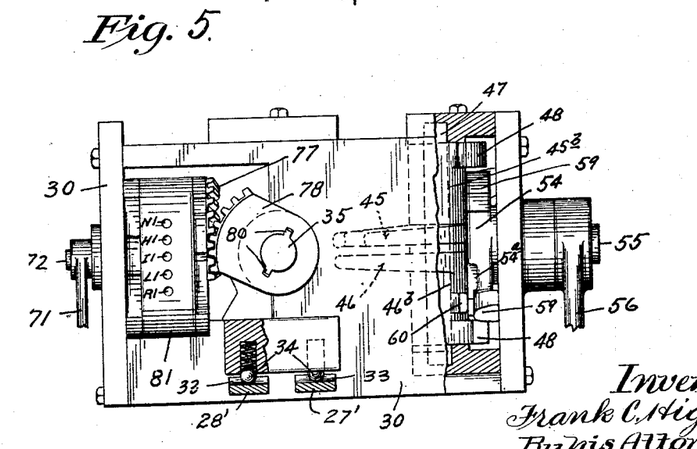
Fig. 5 is a front elevation of the parts shown in Fig. 4, with some parts broken away and some parts sectioned.
Figure 11:
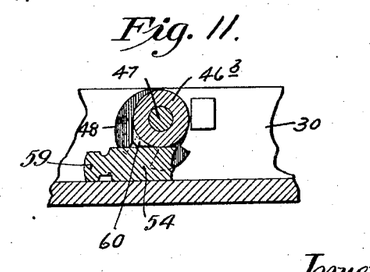
Fig. 11 is a fragmentary section taken on the line 11—11 of Fig. 6.
Figure 12:
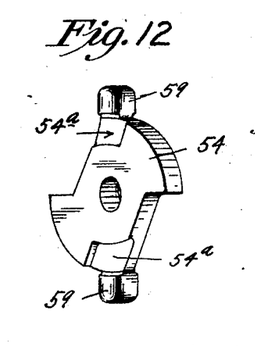
Fig. 12 is a perspective of the so-called shifter jaw rocker.

The rocker 54 is provided with diametrically opposite teeth or lugs 59 that are adapted to be simultaneously engaged with the notched segments 48, but are normally disengaged therefrom. The sleeve-like hubs 45$^b$ and 46$^b$ have lock lugs 60, which, in the normal position of the parts shown in the drawings, (see particularly Figs. 5, 6 and 11) are engaged by the segments of the rocker 54 and positively held against movements until said rocker has first been moved far enough to bring reduced portions 54$^a$ in line with said lugs 60, (see Fig. 12).

The selecting lever 61 is pivoted to a latch segment 62 preferably applied to the steering post casing 63 of the automobile. The latch segment 62 has five notches marked N, H, I, L and R, that respectively represent positions for neutral, high, intermediate, low and reverse positions of the gear shift mechanism.

The lever 61 has a spring-pressed ball or latch element 64 that its yieldingly engageable with the notches just noted. Also, the lever 61 has a laterally movable spring-pressed stop plunger 65, which, when in normal position indicated in Fig. 3, will engage a shoulder 66 on the segment 62 and prevent the lever 61 from being moved into a position for reverse. When the lever is to be moved to a position for subsequent setting of the shift gears for reverse drive, the stop plunger 65 must be pressed laterally so that its offset portion will clear the transversely reduced stop shoulder or flange 66, thereby permitting the spring-pressed ball 64 to be engaged with the notch R.

The lever 61 is secured to the upper end of a rock shaft 67, the lower end of which is journaled in a bearing 68 on the steering post casing 63 and is provided with crank arms 69. The crank arm 69 is connected by a connecting rod 70 to a crank arm 71 on the outer end of a short rock shaft or stem 72 that extends through that side of the box 30 that is opposite to the shaft 55.

Rigidly secured to the lower end of the stem 72 is an oscillatory selecting element preferably in the form of a segment and which, because of the function that it performs, is herein designated as the primary selecting cam 73. Mounted for oscillatory movements adjacent to the primary selecting cam 73 and movable on an axis aligned therewith is a somewhat similar secondary selecting element herein designated as the secondary selecting cam 74. The pivot of this secondary cam is a trunnion 75 journaled in a bearing plate 76 rigidly secured in the box 30.

This secondary selecting cam 74 carries a bevel gear segment 77 that meshes with a bevel gear 78 that is secured on an oscillatory sleeve 79. This sleeve 79 is journaled in the front plate of the box 30, and the front end of the shaft 35 of the shifter head 36 is mounted to slide therethrough and is caused to be rotated therewith by keys or ribs 80 on said shaft.

The segmental outer edges of the primary selecting cam 73 and secondary selecting cam 74 closely follow the concave inner surface of a segmental lock flange or plate 81 that is rigidly secured to the box 30. This lock flange 81 has five radial perforations or lock seats $N^1$, $H^1$, $I^1$, $L^1$, and $R^1$, representing, respectively, neutral, high, intermediate, low and reverse gear positions.

Figure 7:
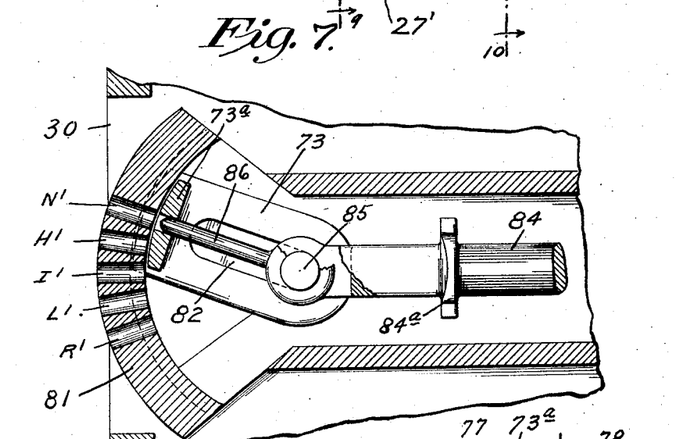
Figs. 7 and 8 are vertical sections on an enlarged scale taken on the line 7—8 of Fig. 4, said two views being viewed from opposite directions and some parts being broken away.
Figure 8:
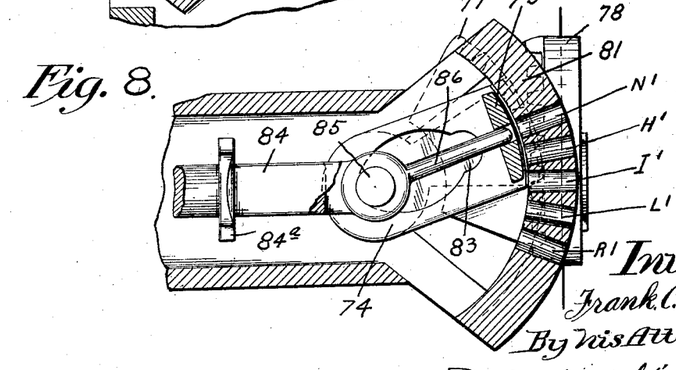

The primary cam 73 has a longitudinal slot or camway 82, as best shown in Fig. 7, the sides of which camway are parallel, and the secondary cam 74 has a slot or camway 83, the sides of which bulge in opposite directions, as best shown in Fig. 8.

For action on the cam slots or ways of the primary and second cams 73 and 74, respectively, I provide a so-called cam aligner that is operated from or in connection with the shifter jaws 45 and 46, through the bell crank 51. This cam aligner, as shown, comprises a plunger 84, the outer end of which is slidable through the upper arm of the bell crank 51, and the inner end of which carries a two-ended cam pin or lug 85 that works in said two camways 82 and 83. A lock pin 86 is pivoted on the intermediate portion of the cam pin 85, works through a flange $73^a$ of the primary cam 73 and is adapted to enter any one of the lock notches $N^1$, $H^1$, $I^1$, $L^1$ or $R^1$ of the lock flange 81. The aligning plunger 84 is capable of vertical swinging movements in a plane parallel to the plane of movements of the cams 73 and 74 and it is yieldingly connected to the upper arm of the bell crank 51 through a coiled spring 87 that is compressed between a fixed collar 88 and a sliding collar or washer 89 on said plunger. The numeral 90 indicates a fixed collar on the plunger 84, and which, by the spring 87, is normally held against the upper arm of the bell crank 51. The plunger 84 is held against rotation by a square collar $84^a$ rigid thereon and arranged to slide between parallel surfaces of the box 30.

Operation.

The use and operation of the gear shift controlling mechanism illustrated in the drawings and above described in detail is as follows:

Regardless of the position in which the selecting lever 61 is set, the driver can move his clutch lever 17 far enough to release the clutch without in any way acting upon the controlling mechanism, and even if the clutch lever should be moved to its extreme or so-called abnormal clutch-releasing position, the relation of the shift gears would not be changed. For example, assume that the selecting lever is set in neutral position as indicated in the drawings and that the clutch lever 17 is given an extreme or abnormal movement. Under these conditions, the final part of the clutch-releasing movement of the clutch lever, acting through the rod 57 and crank arm 56, will oscillate the shifter jaw rocker 54, causing the lugs 59 thereof to operate on the notched segments 48 and thereby reversely move the shifter jaws 45 into positions in which their notches $45^a$ and $46^a$ will be transversely aligned. As the lug 40 of the shifter head 36 is then aligned with the jaw 46, said shifter head will be slid into a central position or to a medial position toward the left in respect to Fig. 4. The said movement of the shifter jaws 45, acting through the arm 49 and bell crank 51, will move the plunger 84 forward or toward the left in respect to Figs. 1, 4 and 7, and will cause the lock pin 86 to enter the lock notch $N^1$, thereby locking the primary selecting cam 73 in the position shown in Fig. 7, but as the secondary cam 74 is then aligned with the cam 73, the cam pin 85, moving down the cam slot 82, will reach the outer extremity of the cam slot 83 and will not impart any movement whatever to the secondary selecting cam 74. Hence, no rotary movement will be imparted to the shifter head 36 under this operation, and when the clutch lever 17 is released and allowed to return to normal position setting the clutch, the shifter head 36 and other parts will simply move back to positions shown in the drawings, without having performed any function whatever. A similar operation would occur with the two cams 73 and 74 aligned in any position in which they may have been previously set, either for high, inermediate, low or reverse.

When, however, the position of the selecting lever has been changed or placed in a position for changing the condition of the sliding gears of the transmission mechanism, very different operations will take place. For example, now assume that the selecting lever 61 is pre-set for causing the subsequent shifting of the gears for low gear, which would require that said selecting lever be moved to a position in which its spring-pressed ball 64 will engage with the notch L of the latch segment 62. When the selecting lever 61 is thus set, it moves the primary selecting cam 73 into a position in which the lock pin 86 is aligned with the lock seat L¹ of the lock segment 81, but does not impart any movement to the secondary selecting cam 74 but, on the contrary, leaves the same, for the time being, where it previously stood. Otherwise stated, the only immediate effect of the pre-setting of the selecting lever 61 is to correspondingly position the primary selecting cam 73, and nothing further will happen until the clutch lever 17 is moved in a clutch-releasing direction to its extreme or so-called abnormal position.

Under the final part of the above noted clutch-releasing movement of the clutch lever 17, the transmission gears that were in mesh will be shifted out of mesh and two important preliminary actions will take place, to wit: First, the lock pin 86 will be caused to enter the lock seat L¹, thereby securing the primary selecting cam 73 in its new or pre-set position and the spring 87 will be compressed because the cam pin 85, in attempting to follow the camways 82 and 83, which camways converge and are then out of alignment, will be intercepted in its movement, for the reason that the shifter head 36 is as yet held against rotation by engagement of the key 44 thereof with the notch $n$ of the lock flange 43. When, however, the jaws 45 and 46 reach positions in which their notches 45ª and 46ª are in alignment, the shifter 36 will be in its medial sliding position with the gap of its lock key 44 aligned with the lock flange 43, and said shifter head, then being free for rotation, will, by the tension of the spring 87, cause the secondary cam 74 to move into alignment with the primary cam in its new position and, acting through the segmental gears 77 and 78, will be rotated into a position in which its lock key 44 will be aligned with the notch L of the lock flange 43.

When the shifter head 36 is rotated as just described and thereby set for low gear position, its lug 39 is moved into the notch 45ª of the upper shifter jaw 45 and its lug 37 is moved between the lugs 32 of the extension slide bar 27'. Then, when the clutch lever 17 is released and allowed to move to clutch-closing position under the tension of the clutch spring 16, the initial part of such movement will move the shifter jaws 45 and 46 back to their normal positions shown in Fig. 4 and, under such movement, the jaw 45, acting on said lug 39 and through the engaged lugs 37 and 32 will impart a forward movement to the shifting rod 27 and extension 27ª, thereby setting the sliding gears for low gear.

The operations for high gear, intermediate gear and reverse are similar to those traced for low gear, but with the following exceptions, towit: for high gear, the lug 40 will be turned into the notch 45ª of the jaw 45 and the lug 37 will be set between the lugs 32 of the extension bar 28', and, under the initial part of the clutch-setting movement of the clutch lever 17, the shifting bar 28 and its extension 28' will be given a forward movement. For intermediate gear, the lug 39 will be moved into the notch 46ª of the jaw 46, and the lug 37 will be engaged between the lugs 32 of the bar 28' and, under the initial part of the clutch-setting movement of the clutch lever 17, the shifting bar 28 and its extension 28' will be given a rearward sliding movement. For reverse, the lug 38 will be moved into the notch 46' of the jaw 46 and the lug 37 will be moved between the lugs 32 of the extension bar 27', and, under initial clutch-setting movement of the clutch lever 17, the shifting bar 27 and its extension 27' will be given rearward movement.

The above noted sliding movements of the shifting bars 27 and 28 are those usually imparted in the ordinary or standard sliding gear transmission mechanism, so that it is obvious that this controlling mechanism may be very readily applied to the slide gears of standard transmission mechanism such as found in automobiles and motor-propelled vehicles already on the market. Of course, the order of operation might be very much changed without departing from the spirit of this invention and, in fact, some cars on the market would require a slightly different arrangement of the order of operation of the shifter bars.

Considering what has already been said, it becomes obvious that, under the forward or clutch-releasing movement of the clutch lever 17, the slide gears are simply moved out of mesh and that, under rearward or clutch-setting movement of said lever 17, the slide gears will be re-set or re-engaged for neutral, high, low, intermediate or reverse, according to the position in which the selecting lever 61 may have been pre-set and, moreover, if said movements of the slide gears take place when the selecting lever has not been changed in position, then the slide gears will simply move back to the same positions in which they were set before the above noted movements of the clutch lever took place. No matter which one of the several positions the primary selecting cam may be set, the secondary cam will follow up and assume a position aligned therewith whenever the clutch lever 17 is given the extreme clutch-releasing and return movements above described.

Attention is further recalled to the fact that, with the arrangement of the lock segment 62 with the intercepting flange 66, it is necessary first to press the stop 65 laterally out of normal position before the selecting lever 61 can be set in position for reverse. This eliminates all possibility of throwing into reverse without doing something entirely different from that required for shifting to any one of the other positions.

Attention is also here more clearly called to the fact that during all of the ordinary clutch-releasing and setting movements of the clutch lever 17, the slide gears are positively locked in whatever position they may be set, because said gear cannot move without moving the shifter head 36, said shifter head cannot move without moving the jaws 45 and 46, and said jaws, during such time, are positively locked by engagement of the segmental portions of the shifter jaw rocker 54 with the lugs 60 of the notch segments 48. As previously stated, when the clutch lever 17 is moved to its abnormal or extreme clutch-releasing position, the notches 54ª of the rocker 54 will be moved under said lugs 60, thereby releasing the jaws 45 and 46 for movements already described.

Attention is further called to the important fact that, if, for any reason, such as play due to wear or by careless setting of the selecting lever 61 in an intermediate position, one of the lugs 38, 39 or 40 should be set, say, in an intermediate position in which it is partly within the notch 45ª of the jaw 45 and partly within the notch 46ª of the jaw 46, no damage whatever could be done because it would then simply serve as a lock or stop to prevent the two jaws from moving back to normal positions and said jaws would then act as stops to prevent the clutch lever from coming back to normal position and would hold the clutch open or released, and, hence, no damage could be done to the slide gears, transmission mechanism and other parts.

Reconsidering statements already made, it will be obvious that all of the gear shifting movements are performed by movements of the clutch lever beyond those movements that are actually required to release or set the clutch. Moreover, when the clutch lever is given only such movements as are required to operate the clutch, the rocker 54 stays under the lock shoulder 60 of the sleeves 45ᵇ and 46ᵇ of the jaws 45 and 46 and thereby keeps the shifting head 36, gears 77 and 78 and secondary cam 74 locked against movements during such clutch-operating movements of said clutch lever.

Attention may be further called to the important fact that, when the clutch lever is moving beyond what is herein treated as the normal clutch-releasing position and into what has been treated as its abnormal clutch-releasing position, and, through the connections described, the plunger 84 is given its initial movement and the cam-locking pin 86 is forced into one of the lock notches of the lock segment 81, all as described, then not only is the primary cam 73 locked in its set position but, through the rod 70 and co-operating connections, the selecting lever 61 is also locked so that it cannot be then moved. Hence, it follows that the selecting lever is free for movements at all times, except when the clutch lever is moving out of the normal clutch-actuating position or zone of movement, but will be locked whenever the jaw-actuating rocker 54 is moved far enough to impart initial movement to the jaws 45 and 46. Stated in another way, said selecting lever will be locked whenever the controlling mechanism has been started into action to effect any predetermined gear-shifting movement. This, of course, prevents the operator from accidentally or otherwise changing the gear-shifting action while the controller is set or started into action to perform another shifting movement of the gears.

Attention may be further called to the fact that the shifting of the gears, both out and into mesh, may be controlled as to speed of such shifting movement by regulating the foot pressure on the clutch lever. To illustrate, the final part of the extreme clutch-releasing movement of the clutch-lever, under control of the foot pressure, causes the shifting of gears out of mesh, and the initial part of the return or clutch-setting movement of said clutch lever, controlled by decreasing foot pressure, regulates the speed at which the slide gears will be slid into mesh and this gear-engaging action may be interrupted, stopped, retarded or increased in speed, at will.

From what has been said, it also clearly follows that shifting of the gears cannot be performed except when the clutch is released or disengaged.

The pre-setting device, including the selecting lever, primary and secondary cams and immediately associated devices, is highly desirable, but nevertheless, the shifter head, co-operating pivoted or otherwise mounted reversely movable so-called jaws and associated clutch connections will perform highly useful functions, even when said shifter head is more directly set. This setting, by rotation or oscillation, of the shifter head, might, for example, be performed by providing the oscillatory sleeve 79 with a lever connection; but in such an arrangement, the oscillation of said shifter head would be performed manually, while the clutch lever was in its extreme or abnormal clutch releasing position.

What I claim is:

1. The combination with the shift gears of a transmission mechanism, of a controlling mechanism therefor comprising primary and secondary selecting cams, means for setting said primary cam in different selecting positions in advance of the gear shifting action, and means for subsequently causing said secondary cam to follow the position of said primary cam and cause the gear shifting action pre-determined by the setting of said primary cam.

2. The combination with a transmission mechanism including shift gears, a clutch and a clutch lever, of primary and secondary selecting cams, means operative at will for setting said primary cam in different selecting positions in advance of the gear shifting action, and means operative by extreme movements of said clutch lever, for causing said secondary cam to follow the position of said primary cam and cause the gear shifting action pre-determined by the setting of said primary selecting cam.

3. The combination with a transmission mechanism including shift gears, a clutch and a clutch lever, of pivoted primary and secondary selecting cams, means operative at will for setting said primary cam in different selecting positions in advance of the gear shifting action, a cam actuator operative when moved to align said secondary cam with said primary cam, means operated by extreme movements of said clutch lever, for causing said cam actuator to perform the function stated, and means whereby the movement of said secondary cam, under control of said clutch lever, will cause the gear shifting action pre-determined by the setting of said primary selecting element.

4. The combination with a transmission mechanism including shift gears, a clutch and a clutch lever, of pivoted primary and secondary selecting cams, means operative at will for setting said primary cam in different selecting positions in advance of the gear shifting action, a cam actuator operative when moved to align said secondary cam with said primary cam, means operated by extreme movements of said clutch lever, for causing said cam actuator to perform the function stated, and means whereby the movement of said secondary cam, under control of said clutch lever, will cause the gear shifting action predetermined by the setting of said primary selecting element, the connection between said cam actuator and clutch lever including a yielding element, rendered operative by the initial movement of said cam actuator for locking said primary cam in a set position in advance of the movement of said secondary cam.

5. The combination with the shift gears of a transmission mechanism, of a controlling mechanism therefor comprising primary and secondary selecting cams, means for setting said primary cam in different selecting positions in advance of the gear shifting action, and means for subsequently causing said secondary cam to follow the position of said primary cam and cause the gear shifting action pre-determined by the setting of said primary cam, the means for setting said primary selecting cam including a lever and a co-operating segment.

6. The combination with the shift gears of a transmission mechanism, of a controlling mechanism therefor comprising primary and secondary selecting cams, means for setting said primary cam in different selecting positions in advance of the gear shifting action, and means for subsequently causing said secondary cam to follow the position of said primary cam and cause the gear shifting action pre-determined by the setting of said primary cam, the means for setting said primary selecting cam including a lever and a co-operating segment, and the means for moving said secondary cam including a lock for said primary cam rendered operative in advance of the movement of said secondary cam.

7. The combination with the shift gears of a transmission mechanism, of a controlling mechanism therefor comprising primary and secondary selecting cams, means for setting said primary cam in different selecting positions in advance of the gear shifting action, and means for subsequently causing said secondary cam to follow the position of said primary cam and cause the gear shifting action predetermined by the setting of said primary cam, said primary and secondary cams being pivoted on coincident axes and having camways that radiate from said axes, and the means for moving said secondary cam including cam pins or projections normally at the pivotal axis thereof and movable in the camways of both of said selecting cams.

8. The combination with the shift gears of a transmission mechanism, of a controlling mechanism therefor comprising primary and secondary selecting cams, means for setting said primary cam in different selecting positions in advance of the gear shifting action, means for subsequently causing said secondary cam to follow the position of said primary cam and cause the gear shifting action predetermined by the setting of said primary cam, said primary and secondary cams being pivoted on coincident axes and having camways that radiate from said axes, and the means for moving said secondary cam including cam pins or projections normally at the pivotal axis thereof and movable in the camways of both of said selecting cams, means for locking said primary cam in advance of the movement of said secondary cam, including a fixed segment with circumferentially spaced lock seats, and a lock pin connected to said cam pin, working through said primary cam and engageable with said circumferentially spaced lock seats.

9. The combination with the shift gears, clutch and clutch pedal of a transmission mechanism, of a controlling mechanism for said gears including a selecting lever, means whereby setting of said lever will predetermine the gear-shifting action performed by extreme movements of said clutch pedal, and means for locking said selecting lever under abnormal clutch-operating movements of said pedal, said clutch-actuating mechanism including primary and secondary selecting elements, the latter of which is arranged to follow the former under manipulations of said pedal, and the former of which elements is adapted to be pre-set by said selecting lever.

10. The combination with a transmission mechanism including shift gears, a clutch and a clutch lever, of primary and secondary selecting elements, means operative at will for setting said primary element in different selecting positions in advance of the gear-shifting action, means operated by extreme movements of said clutch lever, for causing said secondary element to follow the position of said primary element and cause the gear shifting action predetermined by the setting of said primary selecting element, and means for locking said shift gears against movements under normal clutch-operating movements of said clutch lever.

11. The combination with a transmission mechanism including shift gears, a clutch and a clutch lever, of primary and secondary selecting cams, means operative at will for setting said primary cam in different selecting positions in advance of the gear shifting action, means operative by extreme movements of said clutch lever, for causing said secondary cam to follow the position of said primary cam and cause the gear shifting action predetermined by the setting of said primary selecting cam, and means for locking said shift gears against movements under normal clutch-operating movements of said clutch lever.

12. The combination with the shift gears, clutch and clutch lever of a transmission mechanism, of a controlling mechanism for said gears comprising primary and secondary selecting elements, a shifter head mounted for oscillatory and sliding movements and having projecting circumferentially spaced lugs, reversely movable shifter jaws operative selectively on certain of the lugs of said shifter head, a rocker for operating said jaws, means for rendering said rocker operative by extreme movements of said clutch lever, means for setting said primary selecting element in different selective positions in advance of the gear shifting action, means for subsequently causing said secondary selecting element to follow the position of said primary element, and a connection whereby movements of said secondary selecting element oscillates said shifter head to render certain of the lugs of said head subject to said jaws and certain thereof operative to shift the gears.

13. The combination with the shift gears, clutch and clutch lever of a transmission mechanism, of a controlling mechanism for said gears comprising primary and secondary selecting elements, a shifter head mounted for oscillatory and sliding movements and having projecting circumferentially spaced lugs, reversely movable shifter jaws operative selectively on certain of the lugs of said shifter head, a rocker operative by movements of said clutch lever, means for setting said primary selecting element in different selective positions in advance of the gear shifting action, means for subsequently causing said secondary selecting element to follow the position of said primary element, a connection whereby movements of said secondary selecting element oscillates said shifter head to render certain of the lugs of said head subject to said jaws and certain thereof operative to shift the gears, and means locking said shifter head against oscillation when in extreme positions, but releasing the same when slid to an intermediate position.

14. The combination with the shift gears, clutch and clutch lever of a transmission mechanism, of a controlling mechanism for said gears comprising primary and secondary selecting elements, a shifter head mounted for oscillatory and sliding movements and having projecting circumferentially spaced lugs, reversely movable shifter jaws operative selectively on certain of the lugs of said shifter head, a rocker operative by movements of said clutch lever, means for setting said primary selecting element in different selective positions in advance of the gear shifting action, means for subsequently causing said secondary selecting element to follow the position of said primary element, a connection whereby movements of said secondary selecting element oscillates said shifter head to render certain of the lugs of said head subject to said jaws and certain thereof operative to shift the gears, means locking said shifter head against oscillation when in extreme positions, but releasing the same when slid to an intermediate position, and a lock operated by extreme movement of said clutch lever to lock said primary selecting element in its set position.

15. The combination with the sliding shift gears, clutch and clutch lever of a transmission mechanism, of a shifter head mounted for sliding and oscillatory movements, the latter movement determining a certain predetermined function that it will perform in the gear shifting action, reversely movable jaws operative on said shifter head and causing the same to perform a second or different gear shifting functions according to the oscillatory position in which it is set, and means whereby said jaws will be given operative movements under extreme movement of said clutch lever.

16. The combination with the shift gears, clutch and clutch lever of a transmission mechanism, of a controlling mechanism for said gears comprising a shifter head mounted for oscillatory and sliding movements, reversely movable shifter jaws operative selectively on said shifter head, a rocker for operating said jaws, means for rendering said rocker operative by extreme movements of said clutch lever, and adjustable means operative to render said head selectively operative to shift said gears.

17. The construction defined in claim 16 in further combination with means for locking said shifter head against oscillation when in extreme positions but releasing the same when slid to an intermediate position.

In testimony whereof I affix my signature.

FRANK C. HIGGINS.